United States Patent [19]

Kramer

[11] Patent Number: 4,677,721
[45] Date of Patent: Jul. 7, 1987

[54] METHOD FOR FABRICATING AN ELASTOMERIC BEARING ASSEMBLY

[75] Inventor: James H. Kramer, Akron, Ohio

[73] Assignee: The B. F. Goodrich Company, Akron, Ohio

[21] Appl. No.: 813,746

[22] Filed: Dec. 26, 1985

Related U.S. Application Data

[62] Division of Ser. No. 782,785, Oct. 2, 1985, Pat. No. 4,585,359.

[51] Int. Cl.⁴ .................... B21D 53/10; B31C 13/00; B65H 81/00; B32B 1/00
[52] U.S. Cl. ........................ 29/149.5 S; 29/149.5 C; 29/149.5 NM; 29/458; 29/527.2; 156/187; 156/192; 264/255; 264/258; 384/98
[58] Field of Search ............... 29/149.5 S, 149.5 NM, 29/149.5 C, 149.5 R, 527.2, 458, DIG. 25; 156/184, 185, 187, 191, 192; 264/255, 257, 258; 384/97, 98, 295, 296

[56] References Cited

U.S. PATENT DOCUMENTS

| 3,455,613 | 7/1969 | McGrath | 384/97 |
| 4,267,863 | 5/1981 | Burelle | 156/187 X |
| 4,331,496 | 5/1982 | Orndorff, Jr. | 156/187 |
| 4,570,315 | 2/1986 | Kramer | 29/149.5 C |
| 4,577,379 | 3/1986 | Kramer | 29/149.5 S |
| 4,596,471 | 6/1986 | Kramer | 384/98 |

Primary Examiner—Howard N. Goldberg
Assistant Examiner—Ronald S. Wallace
Attorney, Agent, or Firm—Joseph Januszkiewicz

[57] ABSTRACT

The article and method of manufacturing of a bearing assembly wherein the assembly has an inner cylindrical elastomeric sleeve reinforced with at least one ply of a fiber reinforced rubber adhered thereto, a flange with a hub of reduced diameter is mounted and secured onto one end of such sleeve. A fiber reinforced outer rigid plastic shell overlies and is secured to the hub and the rubber fiber reinforced sleeve.

7 Claims, 10 Drawing Figures

U.S. Patent   Jul. 7, 1987   Sheet 1 of 3   4,677,721
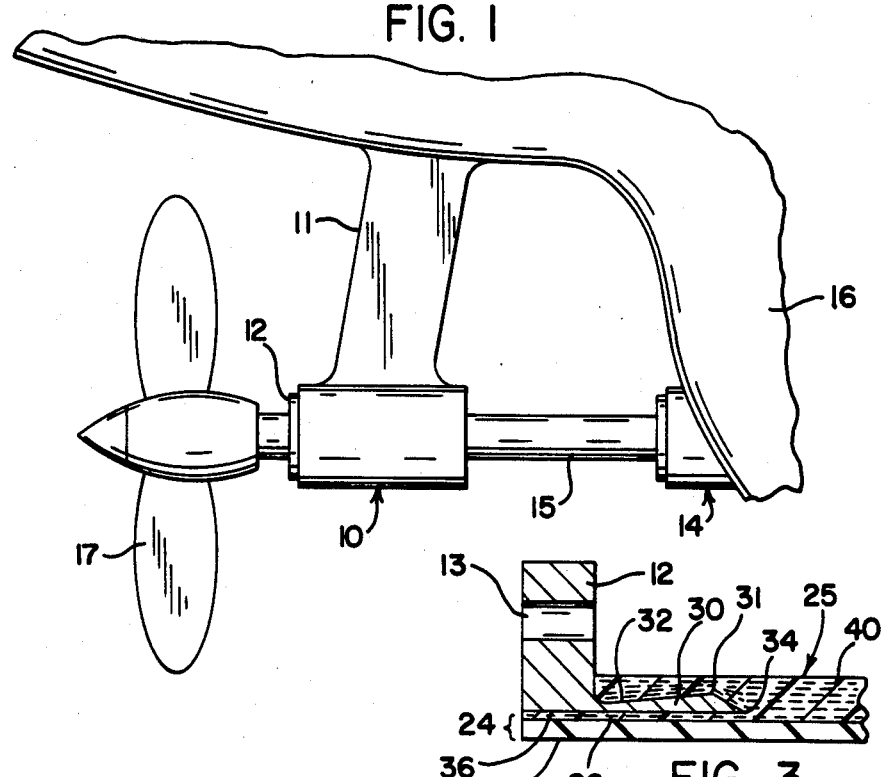
FIG. 1
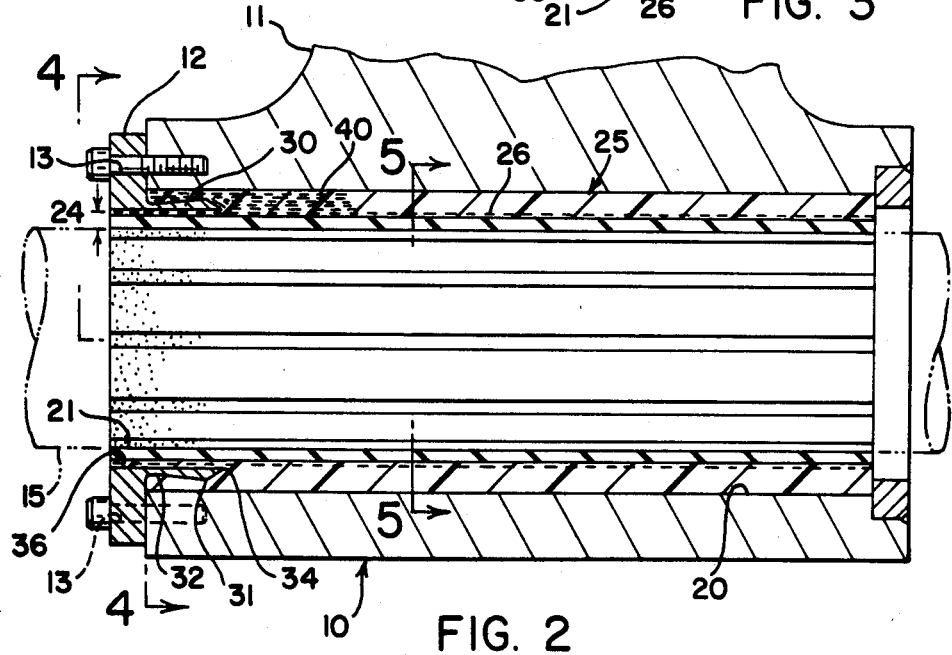
FIG. 3
FIG. 2

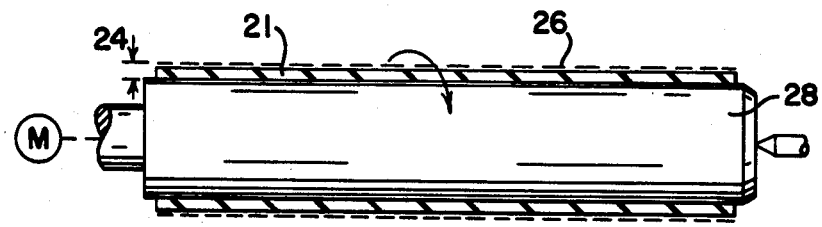
FIG. 7
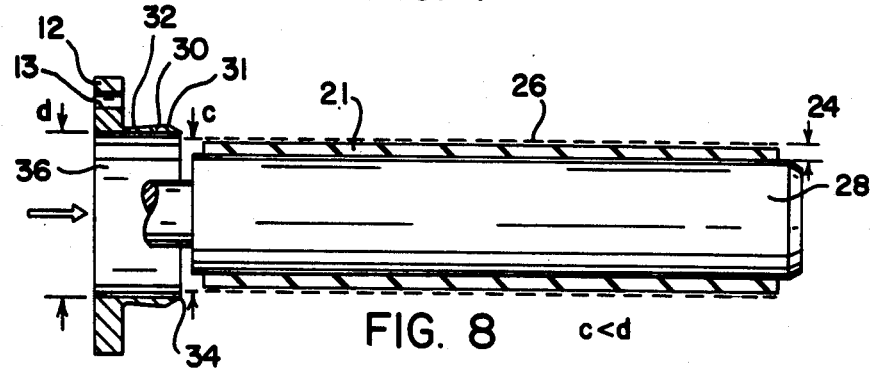
FIG. 8    c<d
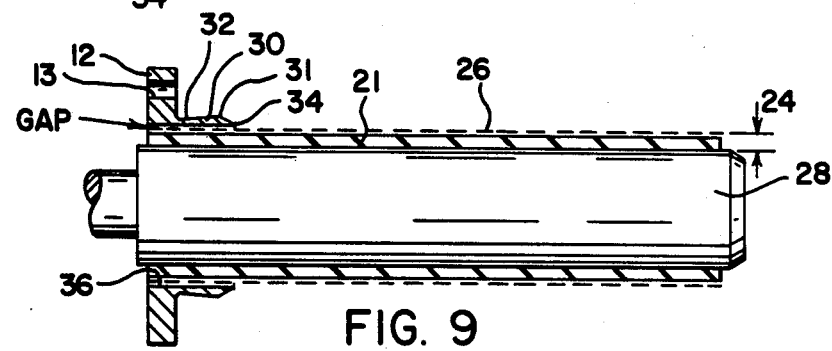
FIG. 9
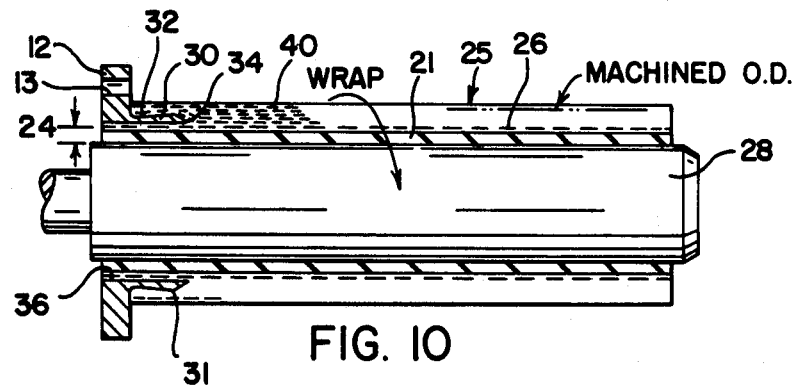
FIG. 10

METHOD FOR FABRICATING AN ELASTOMERIC BEARING ASSEMBLY

This is a division of application Ser. No. 782,785, filed Oct. 2, 1985, now U.S. Pat. No. 4,585,359 issued Apr. 29, 1986.

BACKGROUND OF THE INVENTION

This invention relates to a bearing assembly and more particularly to an elastomeric journal bearing assembly which is adapted for use in supporting marine propeller shafts and to the method of making such bearing. Elastomeric journal bearings have been found to be particularly suited for use in supporting marine propeller shafts because of their ability to withstand the effects of corrosive fluids and to abrasion resulting from bits of foreign materials which are carried in suspension in the sea water or other liquids in which the shaft and journal bearing assembly operate. These types of bearings are also advantageous because of their excellent low friction qualities. Such elastomeric journal bearing assemblies have been made and are still being made with rigid metallic support members but the materials are more expensive and the manufacturing costs are higher. A particular advantage of the elastomeric journal bearings is that since they operate in a liquid medium, they are self lubricated and, therefore, highly desirable for marine use, however, one disadvantage of such bearing is its need for special support. This, however, is overcome in the instant invention by its combining the features of support from the metallic bearing while using the remaining features of the elastomeric bearing assembly.

The present invention is directed to a new and improved bearing assembly and the method of making such bearing assembly utilizing a rigid metallic flange that is integral with the bearing assembly providing the necessary strength for prolonged effective use under demanding conditions while simultaneously utilizing the components of an elastomeric bearing support for the rotating shaft. The invention employs such rigid metal flange by securing it to an inner elastomeric bearing element as well as securing it to an outer plastic shell that provides for ease of manufacture while maintaining a low production cost. The present invention provides the needed rigid support while also providing the superior performance of an elastomeric bearing unit yet keeping the manufacturing cost low.

SUMMARY OF THE INVENTION

The present invention is directed to a new and improved bearing assembly and to the method of making such bearing which has a rigid metallic flange support firmly secured to a non-metallic outer shell which is integral with a cylindrical elastomeric bearing unit which has a plurality of circumferentially spaced bearing elements with water-courses therebetween to facilitate the flow of water lubricant to the bearing elements. The bearing assembly is held in its functional position rigidly while permitting ease of replacement.

BRIEF DESCRIPTION OF THE DRAWINGS

FIG. 1 is a side elevational view of a strut and bearing assembly for supporting a rotatable shaft in accordance with this invention on the hull of a ship;

FIG. 2 is an enlarged cross sectional view of the bearing assembly showing the flange of such bearing assembly connecting the assembly to the housing of the strut;

FIG. 3 is a further enlarged fragmentary cross-sectional view of the flange and outer shell integrally connected to an inner elastomeric cylindrical bearing unit;

FIG. 7 is a diagrammatic view of a rubber-fiberglass sleeve on a mandrel with a single overwrap or ply;

FIG. 8 is a diagrammatic view of a metallic flange and hub positioned for placement on a rubber-fiberglass sleeve of FIG. 9;

FIG. 9 is a diagrammatic view of a metallic flange on a rubber-fiberglass sleeve that is supported by a mandrel as depicted by FIG. 8;

FIG. 10 is a diagrammatic view of flange and sleeve of FIG. 9 being overwrapped depicting a completed bearing assembly prior to machining to the finished size.

DETAILED DESCRIPTION

Figure 4:
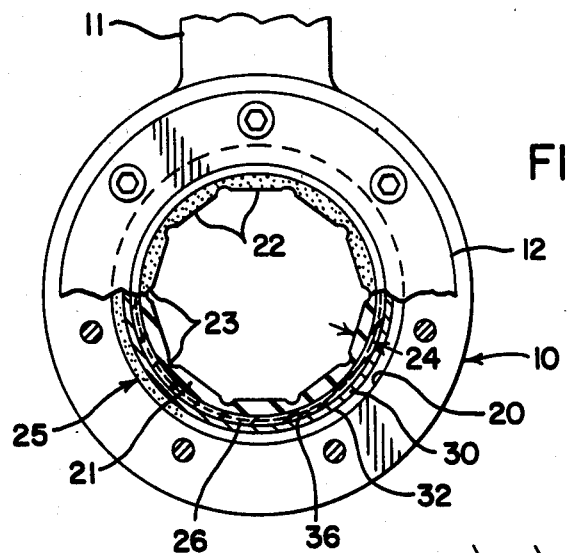
FIG. 4 is a front view partly in section taken generally on line 4—4 of FIG. 2.

Referring to the drawings, wherein like reference numerals designate like or corresponding parts throughout the several views, there is shown in FIG. 1 a longitudinally extending bearing housing 10 supported by a strut 11. A bearing assembly to be described has an annular flanged end section 12, with a plurality of circumferentially spaced bores 13 that receive threaded bolts for securing the bearing assembly and flanged section 12 to the housing 10. A stern housing 14 axially spaced from housing 10 suitably supports a second bearing assembly which in turn supports a shaft 15 that emerges from the ship's hull 16. The shaft 15 has a propeller 17 suitably mounted thereon. The housing 10 has a central bore 20 to accommodate the bearing assembly to be described.

Figure 5:
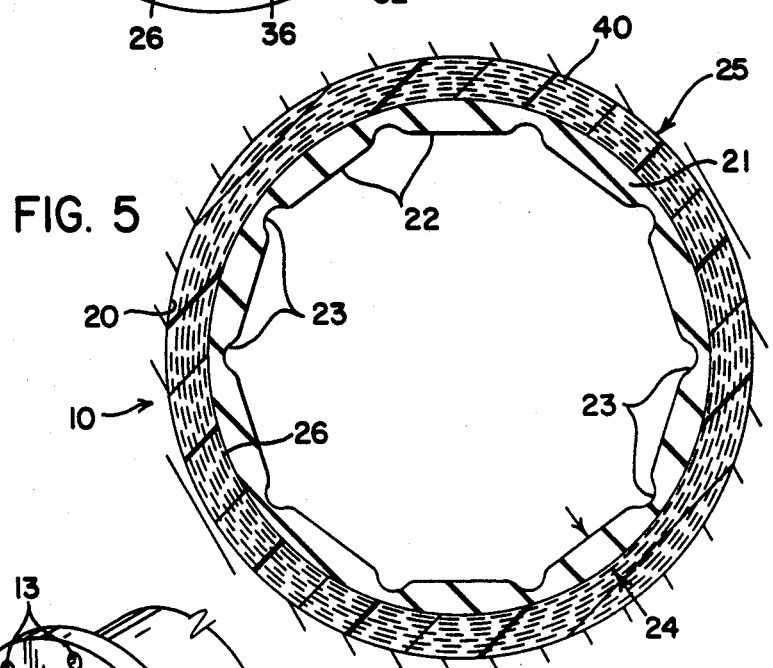
FIG. 5 is an enlarged cross sectional view of the bearing assembly taken on line 5—5 of FIG. 2.
Figure 6:
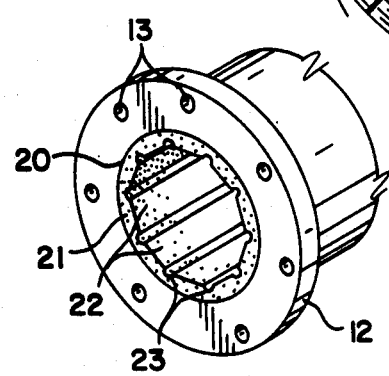
FIG. 6 is an isometric view of the flanged portion of the bearing assembly.

The shaft 15 rotates against a resilient elastomeric or rubber sleeve 21 which can be a cured cylindrical rubber sleeve or a molded resilient vulcanized elastomeric annulus with circumferentially spaced bearing portions 22 (FIGS. 4 and 5) upon which such shaft 15 rotates. Such sleeve 21 also includes a plurality of circumferentially spaced recessed grooves 23 between the bearing portions 22 to facilitate the passage of water through the bearing assembly. Such grooves 23 extend longitudinally of the sleeve 21 in a direction parallel to the axis of the shaft 15. The elastomeric sleeve 21 is suitably secured to an outer rigid cylindrical shell 25 in a manner to be described.

The elastomeric sleeve 21 as shown in FIGS. 7 and 9 has an outer sheet 26 of fabric which may be a single layer as depicted or a multi-layered laminate. Such laminate fabric sheet 26 is woven from reinforcing cords which includes cords, strands, fiberglass, and like thread-like forms which will not corrode or shrink in a liquid environment. Such fabric cords are impregnated in a nitrile rubber solvent cement to form such sheet 26 which may contain suitable crosslinking ingredients to provide the required hardness within the curing conditions that are employed. Such fabric sheet 26 is then bonded to the rubber sleeve 21 to form a single cured integral rubber-fiberglass reinforced sleeve 24 which contains the rubber sleeve 21 with its bearing portions 22, water grooves 23 and the fiberglass reinforced rubber sheet 26.

The elastomeric materials for the rubber sleeve 21 are various conventional nitrile rubber compositions, particularly compositions comprising polymers of butadiene and acrylonitrile where butadiene is the major component of the polymer. Also, natural and other synthetic rubber compositions are possible, provided they have sufficient strength and heat resistance to withstand temporary operation out of the presence of the lubricating liquid such as start-up.

The rubber-fiberglass reinforced sleeve 24 after being cured is mounted on a mandrel 28 which is operatively connected to a suitable power source for rotation in a manner well known in the art.

The annular metal flanged end section 12 is then positioned adjacent one end of the sleeve 21 which is positioned on mandrel 28. The flanged end section 12 can be made from brass, bronze, stainless steel, monel, aluminum or from any other of the various types of ferrous metals. Brass or bronze are particularly useful due to their resistance to corrosion in salt water. In industrial applications and in those instances where electrolysis is a problem, a material is chosen which is the same as or compatible with the material to which the flange is attached.

The flanged end section 12 has a hub 30 with a circumferentially extending apex 31 that tapers radially inwardly towards the main body portion of the flanged portion of section 12 producing a necked down portion 32. The hub 30 also tapers radially inwardly from the apex 31 away from the main body portion of the section 12 to a forwardly disposed edge 34. The flanged end section 12 has a central bore 36 slightly greater in diameter than the outside diameter of the fiberglass reinforced rubber sleeve 24 such that an adhesive material such as epoxy is filled into this gap prior to the placement of end section 12 onto the end of rubber-fiberglass reinforced sleeve as seen in FIG. 8 to thereby firmly secure the members.

The outer surface of hub 30 of the flanged end section 14 may be knurled or grooved such that when overwrapped with plies impregnated with fiberglass material the hub is firmly secured and will not move relative to the other parts of the bearing assembly.

With the flanged end section 12 firmly secured to the rubber-fiberglass sleeve 24 as described above, the sleeve 24 and mandrel 28 are then rotated while a woven fabric of fiberglass is wrapped onto the outer periphery of the hub 30 and the rubber-fiberglass reinforced sleeve 24 while the fabric is coated with an epoxy resin. The fiberglass fabric and resin may be applied manually or by any known mechanical means. The number of layers of impregnated fiberglass fabric 40 that is applied around the outer surface of the sleeve 24 and hub 30 is determined by the desired size needed for a specific application. The finished product after winding and the curing of the epoxy resin may be machined to the desired finished diameter.

A specific example of the epoxy resin useful in the present invention is one by the trade name "APCO" available from Applied Plastics Company, Inc. of 612 Franklin Avenue, El Segundo, California 90245. The epoxy resin has a specific gravity of 1.165 and its accompanying curing agent or hardner has a specific gravity of 1.809. The epoxy resin has a Shore D 25° C. hardness of 84 with a glass transition temperature of 196° F. The viscosity of the epoxy resin is 2000 cps (1800±300); while the viscosity of the hardner is 410 cps (310±200).

The fiberglass fabric for the overwrapping of the fiberglass reinforced rubber sleeve 21 may be supplied from a storage roll suitably supported on a shaft such that as the mandrel 28 is rotated the fiberglass fabric is fed to the sleeve 24 to facilitate the winding operation. To effect the curing of the wrapped fiberglass and epoxy resin, the mandrel 28 is slowly rotated until cure of the epoxy resin is effected providing the outer rigid cylindrical fiberglass reinforced plastic shell 25.

The unique combination of the flange's hub 30 and its firm connection to the fiberglass reinforced rubber sleeve 24 as well as to the overwrapped fiberglass reinforced plastic (epoxy) shell 25 prevents the flange from rotating and being pulled out of the finished bearing assembly. To insure greater strength between these parts, the hub may be cemented at its tapering surfaces to the fiberglass reinforced plastic shell 25 as well as to the rubber-fiberglass reinforced sleeve 24.

Such method of fabricating a bearing assembly as described above is efficient and cost effective while providing the advantage of a metallic flange support integral with a non-metallic bearing assembly.

Various modifications are contemplated and may be resorted to by those skilled in the art without departing from the described invention, as hereinafter defined by the appended claims, as only a preferred embodiment thereof has been disclosed.

I claim:

1. A method of manufacturing a bearing assembly comprising the steps of preforming a generally cylindrical elastomeric sleeve, providing at least a ply of fiber reinforced elastomer onto said elastomeric cylindrical sleeve to provide a fiber reinforced cured elastomeric bearing blank, mounting the bearing blank onto a rotatable mandrel, applying an adhesive onto one exterior end surface of the bearing blank, mounting a metallic annular flange with an inwardly extending hub onto said one exterior surface of the bearing blank into frictional contact with said adhesive, rotating said spindle and wrapping a fiber fabric onto the outer circumferential surface of the bearing blank and hub while impregnating the fiber fabric with a plastic resin, and curing said resin to complete a fiber reinforced shell that is molded into firm engagement with said hub and said bearing blank.

2. A method of manufacturing a bearing assembly as set forth in claim 1 wherein said outer shell is sized to a finished diameter.

3. A method of manufacturing a bearing assembly as set forth in claim 2 wherein the outer surface of said hub is serrated prior to mounting onto said bearing blank.

4. A method of manufacturing a bearing assembly as set forth in claim 2 wherein the outer surface of said hub is tapered radially outwardly from said flange progressively outwardly on said hub prior to mounting onto said bearing blank.

5. A method of manufacturing a bearing assembly as set forth in claim 2 wherein the outer circumferential surface of said hub is tapered radially outwardly from the juncture with said flange to a peripheral apex and is thence tapered radially inwardly from said apex to an outer edge spaced from said flange prior to mounting onto said bearing blank.

6. A method of manufacturing a bearing assembly as set forth in claim 5 wherein an adhesive is applied to said outer circumferential surface of said hub prior to the wrapping of a fiber fabric onto said hub.

7. A method of manufacturing a bearing assembly comprising the steps of preforming a generally cylindrical elastomeric sleeve, providing at least a ply of fiber reinforced elastomer onto said elastomeric cylindrical sleeve to provide a fiber reinforced cured elastomeric bearing blank, mounting the bearing blank onto a rotatable mandrel, applying an adhesive onto one exterior end surface of the bearing blank, mounting a metallic annular flange with an axially inwardly extending hub that extends a short distance onto said one exterior surface of said bearing blank into frictional contact with said adhesive, rotating said spindle and wrapping a fiber fabric onto the outer circumferential surface of said bearing blank and said hub while impregnating said fiber fabric with a plastic resin, curing said resin to complete a fiber reinforced shell that is molded into firm engagement with said hub and said bearing blank, and wherein the outer surface of said hub is tapered radially outwardly from said flange progressively outwardly on said hub prior to mounting onto said bearing blank.

* * * * *